Patented Nov. 21, 1950

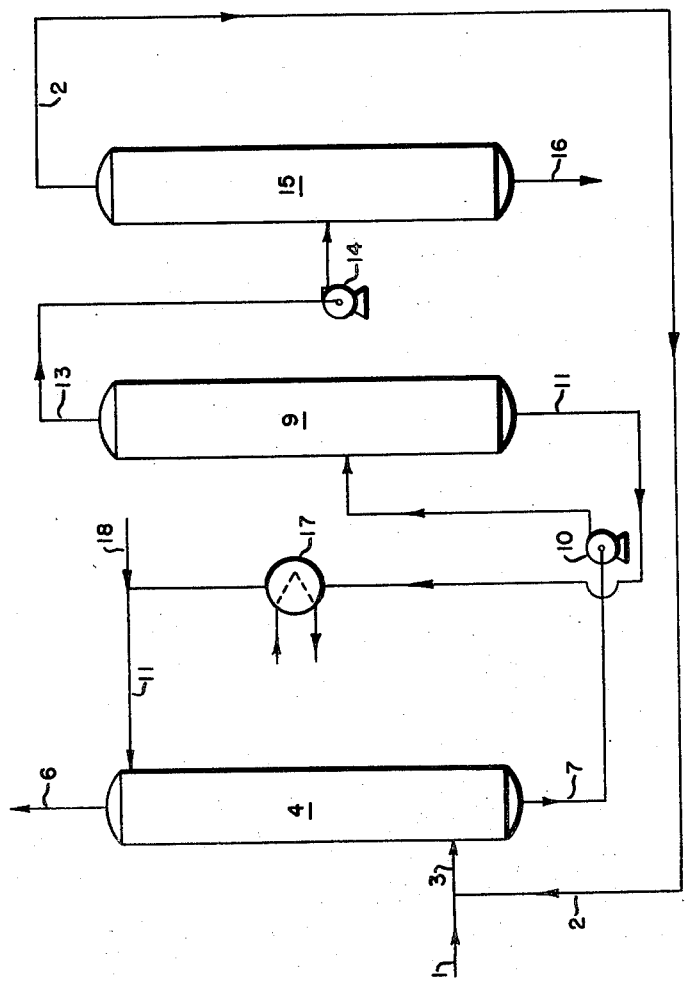

2,531,361

UNITED STATES PATENT OFFICE 2,531,361

RECOVERY OF CHLORINATED HYDROCARBONS

Frank L. Padgitt, Baton Rouge, La., assignor to Ethyl Corporation, New York, N. Y., a corporation of Delaware Application January 11, 1950, Serial No. 137,921

9 Claims. (Cl. 183—115)

This invention relates to the recovery of chlorinated hydrocarbons from mixtures thereof with hydrocarbons. In particular, the invention relates to the separation and recovery of chlorinated hydrocarbons from mixtures with alkane hydrocarbons.

Mixtures of this type are frequently found in the chemical industry, and present the problem of separation and recovery of the chlorinated hydrocarbon therein. This is usually accomplished by the fractional distillation of the mixture. However, in many instances fractional distillation is difficult or expensive because of the closeness of the boiling points. Azeotropic mixtures are, of course, incapable of separation by conventional distillation procedures.

The object of this invention is to provide a new method of separation of a chlorinated aliphatic hydrocarbon from admixture with an alkane hydrocarbon. A further object is to provide a process for recovering from such a mixture a fraction substantially enriched in chlorinated hydrocarbon content. An additional object is to provide a method for the separation and recovery of a chlorinated aliphatic hydrocarbon from azeotropic mixture thereof with an alkane hydrocarbon.

I have now discovered a process whereby these objects are attained. The process comprises contacting the original mixture of a chlorinated aliphatic hydrocarbon and alkane hydrocarbon with a solvent comprising a carboxylic acid, selectively absorbing the chlorinated aliphatic hydrocarbon therein, and thereafter separating the chlorinated compound from the solvent. It has been found that the carboxylic acids have a preferential selective solvent action for chlorinated aliphatic compounds, whereby they can be recovered in high purity even from azeotropic mixtures.

Examples of chlorinated hydrocarbons which are recoverable by this process are the alkyl chlorides, such as ethyl chloride and methyl chloride. Dichloro compounds, for example, 1,2-dichloroethane and 1,1-dichloroethane are also recoverable. The method is not restricted to saturated compounds, unsaturated chlorinated compounds also being susceptible of recovery by the process, as for example, trichloroethylene. In general the process is utilized for the separation and recovery of these chlorinated hydrocarbons from admixture with the low molecular weight normally gaseous alkane hydrocarbons. The process is particularly beneficial in the separation of the azeotropic mixtures, for example, the azeotrope formed by ethyl chloride and normal butane. The invention can be more readily understood by reference to the accompanying figure showing the equipment and method of carrying out one embodiment.

Referring to the figure, the principal units of apparatus employed in the process are an absorber 4, a stripper 9, and a final fractionation column 15. The fresh mixture containing the chlorinated hydrocarbon to be recovered is fed through line 1. This fresh feed is combined with a recycle stream from line 2, mixing in line 3 before being fed to the absorber 4. The recycle stream in line 2 contains appreciable quantities of the chlorinated hydrocarbon to be recovered, and in the case of azeotropic feed mixture, the recycle stream is of the azeotropic composition.

In the absorber 4, the feed stream is countercurrently contacted with the selective absorbent or solvent which is introduced through line 11. The absorber 4 is filled with suitable contacting packing such as Raschig rings, Berl saddles, or the like. If desired, the absorber 4 can be constructed as a bubble plate column, but ordinarily it will be preferred to use conventional packing as described. The outlet streams from the absorber 4 are a gaseous overhead in line 6, and an extract discharged from the absorber in line 7. The overhead stream in line 6 predominates in the hydrocarbon from which the chlorinated hydrocarbon has been separated. The extract in line 7 comprises the absorbent solvent, and the absorbed chlorinated hydrocarbon, and minor quantities of hydrocarbon. The extract stream is fed to a stripper 9 by pump 10. The stripper 9 is a fractionating column in which the absorbed chlorinated hydrocarbon is separated and discharged through the overhead line 13. The bottoms, comprising the solvent acid, is recycled through line 11 for reuse in the absorption column 4. Heat exchanger 17 is used for cooling the recycled acid to the operating temperature of the absorber 4. Make up solvent, when necessary, is added through line 18.

The overhead stream in line 13 from the stripping column 9 contains the chlorinated hydrocarbon to be recovered, plus minor amounts of the hydrocarbon originally present. The quantity of hydrocarbon impurity in the overhead stream will vary with the original mixture composition, the specific carboxylic acid solvent used and with the conditions of operation. In all cases, however, due to the pronounced selective nature of the carboxylic acid solvents, the proportion of alkane hydrocarbon is substantially lower than in the original feed mixture. This overhead stream is fed by pump 14 to the final fractionating column 15. Here the pure chlorinated hydrocarbon is normally recovered as a bottoms stream which is discharged through line 16 to subsequent use or storage. The hydrocarbon content of the feed to the final fractionation column 15 is discharged overhead through line 2, and is recycled to the absorber 4. In those cases in which the original feed mixture is an azeotropic mixture, the hydrocarbon recycled through line 2 is accompanied by chlorinated hydrocarbon corresponding to the azeotrope composition. In other cases the hydrocarbon overhead is accompanied by small amounts of chlorinated hydrocarbon, the composition being dependent on the efficiency of fractionation in tower 15.

It will be understood that the usual reboilers and condensers are included as a part of the fractionating columns 9 and 15. These columns will ordinarily be multiple plate fractionating columns, but packed type fractionating columns can be used if desired.

A typical and commercially important mixture of the type which can be processed by the invention is the azeotropic mixture of ethyl chloride and normal butane, which contains 15.6 weight percent ethyl chloride and 84.4 percent normal butane. The following describes how ethyl chloride can be recovered from this mixture, using formic acid as the selective solvent in the embodiment shown by the figure. Referring to the figure, 100 parts by weight of the azeotrope would be fed through line 1 and combined with 26 parts of azeotrope recycled through line 2. The feed mixture to the absorber 4 then comprises 126 parts of the azeotrope composition. This feed will be contacted in the absorber with 8240 parts of 90% formic acid. The usual operating temperature and pressure for the absorber are 80 to 95° F., and atmospheric to 10 pounds per square inch, gauge, respectively. An operating pressure slightly above atmospheric is adequate, although a further increase in pressure will increase the capacity of the absorber. About 39 parts is absorbed by the formic acid from the feed gases, the adsorbed material consisting of 44 weight percent ethyl chloride and 56 percent normal butane.

The extract stream is passed through line 7 and pump 10 to the stripping column 9. In the stripping column the 39 parts of enriched ethyl chloride-butane mixture is fractionated from the solvent, and passed through line 13 and pump 14 to the final recovery column 15. A portion of the ethyl chloride is here separated by fractionally distilling the butane present as an overhead stream, the butane being accompanied by a small amount of ethyl chloride corresponding to the azeotrope mixture. The bottoms stream consists of 13.1 parts of pure ethyl chloride, which is discharged through line 16 to storage or subsequent use. This ethyl chloride amounts to recovery of 85 percent of the ethyl chloride in the feed stream. The overhead from the final recovery column 15, corresponding in composition to the initial feed, is recycled through line 2 for reprocessing in absorber 4.

It will be understood that the above example is merely illustrative of the manner of utilizing the invention and that numerous other embodiments are possible. The alkyl carboxylic acids in general are suitable by virtue of their selective solvency for the chlorinated hydrocarbons, but the preferred solvents are the lower molecular weight acids, particularly those containing up to four carbon atoms. The selective solvent power of the several acyclic carboxylic acids varies in degree. The selectivity of the acids is, however, sufficiently marked to effect an enrichment of chlorinated hydrocarbon. As an example of the selective solvency obtainable, we have found 11 times as much methyl chloride as propane will dissolve in glacial acetic acid. Glacial acetic acid also will dissolve or absorb 2 times the quantity of methyl chloride as it will normal butane, and 2.9 times as much as isobutane. Similar solvent preference, in greater degree, is shown toward ethyl chloride. Thus, the amount of ethyl chloride soluble in glacial acetic acid is 86 times the quantity of propane soluble at the same conditions, 14.7 times the quantity of normal butane and 22 times the quantity of isobutane. Formic acid and butyric acids are not fully as effective as glacial acetic acid, but do show acceptable selective solvency. For example, the amount of ethyl chloride which will dissolve in 90 percent grade formic acid is 2.9 times the quantity of normal butane which will dissolve at the same conditions. With butyric acid as the solvent, 5.1 times as much ethyl chloride as normal butane will dissolve. Selective solvent action is exhibited in even greater degree by carboxylic acids with respect to the more highly chlorinated compounds such as 1,2-dichloroethane and trichloroethylene. For example, 1,2-dichloroethane is soluble in practically all proportions in glacial acetic and in 95 percent acetic acid, whereas propane, normal butane and isobutane are soluble to only a very limited extent; of the order of 1 or 2 weight percent. It will be understood that the selectivity and absorbing power of the solvents may be modified by the addition of anti-solvents or various modifying agents. For example, the addition of small amounts of water is particularly useful in changing the selectivity of the carboxylic acids. It has been found that the selective solvency of a pure carboxylic acid diminishes when the alkane hydrocarbon contains more than four carbon atoms, but small amounts of water are effective in maintaining the selectivity. For example, glacial acetic acid loses its selective solvency if the hydrocarbon in the mixture fed or processed is normal pentane or normal hexane. The selectivity of the acid, however, can be maintained even in such instances by the use of 5 percent water added to the glacial acetic acid.

In order to further illustrate the invention, the following example is given. A gaseous azeotropic mixture of ethyl chloride and butane was contacted with a solvent comprising either 90 percent formic acid, or in another instance glacial acetic acid. The weight ratio of ethyl chloride: butane in the azeotropic feed material was 0.185:1.0. The contacting or absorbing operation was carried out at room temperature and atmospheric pressure. The percent of the ethyl chloride fed which was absorbed, and the ratio of the absorbed ethyl chloride to the absorbed butane, were determined. The results of these operations follow:

| Solvent | Parts by Weight | | Absorption Temp., °F. | Ethyl chloride absorbed, per cent of feed | Ratio of ethyl chloride butane absorbed |
|---|---|---|---|---|---|
| | Solvent | Feed (15.6% ethyl chloride, 84.4% n-butane) | | | |
| 90% formic acid | 1,800 | 28 | 87 | 87 | 0.78 |
| Do | 1,800 | 28 | 84 | 90 | 0.93 |
| glacial acetic acid | 1,570 | 83 | 90 | 94 | 0.22 |

It will be noted that in every case the ratio of the ethyl chloride:normal butane absorbed was substantially increased over the corresponding ratio, 0.185:1.0 in the feed stream. In addition, a high percentage of the ethyl chloride fed was recovered in the absorbed portion. The percentage absorbed can, of course, be increased to substantially complete absorption by increasing the amount of solvent used.

Numerous variations are of course possible in various embodiments of the process. It will be noted that the preferential selective absorption is of benefit whenever it is desired to separate a fraction of the original feed which is enriched in the chlorinated aliphatic hydrocarbon. The process is, of course, especially useful when it is desired to isolate and recover a pure chlorinated aliphatic hydrocarbon from an azeotropic mixture, as heretofore described. The operating conditions are susceptible to wide variation, according to the specific mixture fed to the process, and the carboxylic acid solvent employed. The invention is accordingly limited only by the following claims.

I claim:

1. The process of recovery of a chlorinated aliphatic hydrocarbon from admixture with an alkane hydrocarbon comprising contacting said mixture with an alkyl carboxylic acid and selectively absorbing the chlorinated hydrocarbon and thereafter separating the chlorinated hydrocarbon from the alkyl carboxylic acid.

2. The process of recovery of a chlorinated aliphatic hydrocarbon from a gaseous mixture with an alkane hydrocarbon comprising contacting the mixture with an alkyl carboxylic acid and selectively absorbing the chlorinated hydrocarbon therein, then fractionally distilling the chlorinated hydrocarbon from the alkyl carboxylic acid.

3. The process comprising contacting a mixture of a chlorinated aliphatic hydrocarbon and an alkane hydrocarbon with an alkyl carboxylic acid and absorbing therein a fraction of the mixture enriched in chlorinated hydrocarbon and thereafter fractionally distilling the enriched portion from the alkyl carboxylic acid.

4. The process of recovering ethyl chloride from azeotropic mixture with normal butane comprising contacting the mixture with 90 percent formic acid and selectively absorbing the ethyl chloride therein, and thereafter fractionally distilling the dissolved ethyl chloride from the formic acid.

5. The process of recovering an enriched mixture of ethyl chloride and normal butane containing more than 15.6 percent by weight of ethyl chloride comprising contacting an azeotropic mixture of ethyl chloride and normal butane with 90 percent formic acid and selectively absorbing the enriched mixture therein and thereafter fractionally distilling the enriched mixture from the formic acid.

6. The process of recovery of a chlorinated aliphatic hydrocarbon from admixture with an alkyl hydrocarbon comprising contacting said mixture with an alkyl carboxylic acid having less than 5 carbon atoms and selectively absorbing the chlorinated hydrocarbon and thereafter separating the chlorinated hydrocarbon from said carboxylic acid.

7. The process of claim 6 in which the carboxylic acid is formic acid.

8. The process of claim 6 in which the carboxylic acid is acetic acid.

9. The process of claim 6 in which the carboxylic acid is butyric.

FRANK L. PADGITT.

REFERENCES CITED

The following references are of record in the file of this patent:

UNITED STATES PATENTS

| Number | Name | Date |
|---|---|---|
| 2,275,151 | Kimberlin | Mar. 3, 1942 |